Feb. 24, 1959

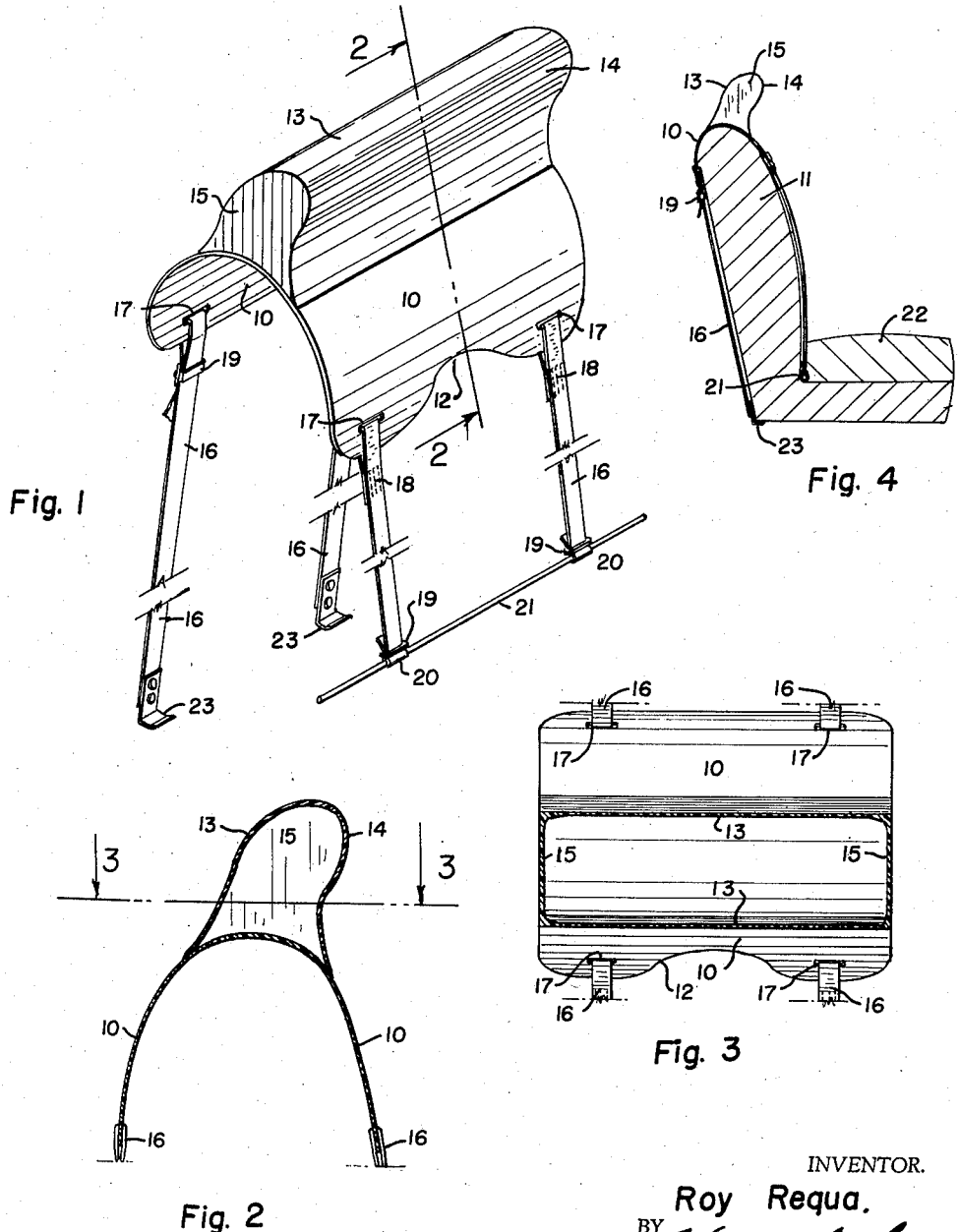

R. REQUA 2,874,757

HEADREST ACCESSORY

Filed Feb. 4, 1957

INVENTOR.

Roy Requa.

BY

ATTORNEY

United States Patent Office 2,874,757
Patented Feb. 24, 1959

2,874,757
HEADREST ACCESSORY
Roy Requa, Denver, Colo.

Application February 4, 1957, Serial No. 638,021

5 Claims. (Cl. 155—173)

This invention relates to headrest accessories adapted for convenient detachable association with the back sections of conventional seat organizations of diverse type and construction to promote ease and comfort of the seat occupant, and more particularly to such an accessory especially adapted for operative association with the back sections of seats conventionally provided for passenger use in transportation facilities, such as automobiles, motor and railway coaches, aircraft, and the like, and has as an object to provide a novel and improved headrest unit of enhanced expediency, practicality, and utility.

A further object of the invention is to provide a novel and improved headrest accessory convenient of detachable operative association with and to extend the height of the back sections of conventional automobile seats, and the like, without permanent attachment to or occasion for modification of the conventional seat organization.

A further object of the invention is to provide a novel and improved detachable headrest accessory that is simple and economical of production from known and readily-available materials.

A further object of the invention is to provide a novel and improved detachable headrest accessory that is secure and sightly in use association with a seat back section.

A further object of the invention is to provide a novel and improved detachable headrest accessory that is inherently and comfortably conformable to the positional requirements and preferences of the user.

A further object of the invention is to provide a novel and improved detachable headrest accessory that is adjustably conformable to secure operative association with seat back sections of varying shapes and structural particularity.

A further object of the invention is to provide a novel and improved detachable headrest accessory amenable to production in an extensive range of sizes and variation of structural detail.

A further object of the invention is to provide a novel and improved detachable headrest accessory that is durable and long-lived in use, susceptible of ready shift from one and to another use position on the same or alternate mountings, adapted for production in any selected one or desired range of colors, and that is positive and efficient in attainment of the ends for which designed.

With the foregoing and other objects in view, my invention consists in the construction, arrangement, and operative combination of elements as hereinafter set forth, pointed out in my claims, and illustrated by the accompanying drawings, in which—

Figure 1 is a perspective view of a typical embodiment of the invention as conditioned for installation in position of use, portions of the attaching elements shown in the view being broken away to conserve space.

Figure 2 is a transverse section vertically through the organization according to Figure 1 taken substantially on the indicated line 2—2 of said latter view, the attaching elements being largely omitted to conserve space.

Figure 3 is a section horizontally through the organization according to the preceding views taken substantially on the indicated line 3—3 of Figure 2.

Figure 4 is an end view, on a relatively reduced scale, of the improvement represented by the preceding views in mounted association with a conventional automobile seat assembly, shown in section.

Figure 5:
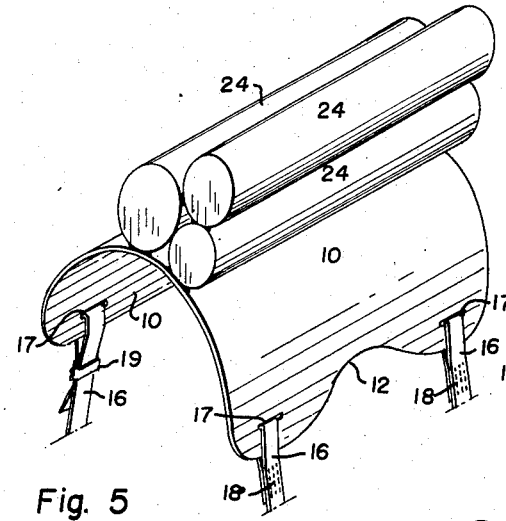
Figure 5 is a view similar to Figure 1 illustrating a modified construction of the headrest unit within the contemplation of the invention.
Figure 6:
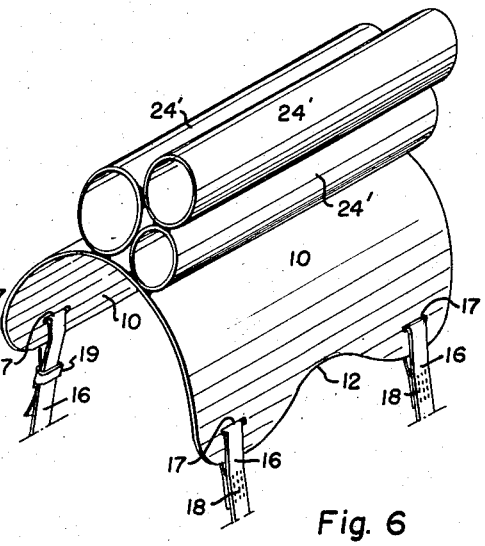
Figure 6 is a view similar to Figure 5 illustrating an alternative type of element applicable to development of the modification according to said latter view.

The occasion for and the desirability of a rest for the comfortable support of the head of one occupying a seat are so manifest as to preclude extended discussion thereof, and many such rests have been hitherto devised. However, the seats conventionally characterizing transportation facilities, especially those of the usual passenger automobile, provide no rest for the head of the occupant and are so low in the back section as to be inadequate for head support, whence derive avoidable passenger fatigue and discomfort developed to acute degree during long transits. While it is entirely practical to supply various headrest constructions in fixed association with the back sections of seats, automobile or other, such installations made subsequent to assembly of the seat require some reworking of the latter with consequent expense and undesirable permanent alterations, and the result is, at best, a fixed rest susceptible of little adjustment to accommodate user preferences and difficult of shift between alternative positions of use. The utility and advantages of a headrest accessory adapted for detachable and adjustable association with and in extension above the back sections of conventional automobile, and other, seats being obvious, the instant invention is hence directed to the provision of such a facility characterized by unique comfort of use and facility of mounting in use position without any reworking whatever of the seat assembly mounting to which it is applied.

Peculiarly adapted for production from the synthetic resin materials commonly grouped under the term "plastics," the improvement illustrated and hereinafter described may be formed through simple assembly and fabricating operations from principal elements of such materials molded, pressed, shaped, or otherwise conventionally worked to the forms and for the associations hereinafter set forth; production of the principal elements of the improvement from synthetic resin materials serving to apply with practical effect the inherent tough, flexible, and air-impermeable properties thereof and to utilize the extensive range of colors in any of which the material may be available.

In the embodiment of the improvement according to Figures 1-4, inclusive, a primary element of the ultimate unit assembly is a semi-tubular, concavo-convex skirt 10 formed from an initially substantially rectangular sheet of air-impermeable, stiffly-pliant material, such as a synthetic resin of appropriate weight, or the equivalent, sized to engage over the exposed upper margin of a conventional seat back section 11 and overlap front and rear surface areas of said section in a length parallel to the section upper margin approaching average human shoulder span. Corners of the skirt 10 desirably are rounded, as illustrated, and the straight margins of the skirt may be contoured, as indicated at 12, for sightly effect, to conserve material, reduce weight, and to minimize the skirt area exposed to engagement by the person of the user. The rest or support element of the assembly coactable with the head of a user is an inverted, trough-like member 13 fixed to, longitudinally of, and disposed to project radially from the convex surface of the skirt 10 parallel to and approximately midway between the straight margins of the latter. The member 13 is formed from air-impermeable, stiffly-pliant material expediently the same as that utilized for the skirt 10 in any feasible desired manner, as by pressing, molding, or fabrication, and to the shape of an elongated trough of uniform cross section transversely contoured and recurved at one side to present a smoothly-rounded, convex nosing 14 longitudinally thereof and to bulge laterally therefrom adjacent the trough floor. The member 13 is desirably, although not necessarily, of a length equal to that of the associated skirt 10 and is provided with end closure panels 15 perpendicular thereto in an integral or affixed relationship therewith productive of an air-tight junction therebetween. Free margins of the member 13 and panels 15 defining the open side of the member are worked and shaped to conformably engage with the convex crown of the skirt 10 when the member is inverted thereover, and said margins are adhered and sealed to the sheet material of the skirt thereby engaged in any manner and by any means, such as heat-welding, effective to fully close the resulting joints against air passage therethrough, whereby to secure the member 13 permanently to and in radial extension as a closed, hollow cushion from the associated skirt with the member nosing 14 disposed to spacedly parallel to and to incline forwardly from the upper margin of a seat back section 11 embraced within the concavity of the skirt. The hollow, air-filled and air-tight cushion constituted from stiffly-pliant material as shown and described yieldably accommodates and supports pressures applied exteriorly thereto and resiliently returns to its original shape when deforming pressures are withdrawn and is distinguished by notable properties of user ease and comfort, but it is within the contemplation of the invention that the cushion may be of other structural particularity adapted to function in similar manner and that the hollow cushion member shown and described may be charged with a filling of any yieldable material customarily employed for cushioning purposes, whenever such variation is deemed to be desirable.

The unitary assembly of the skirt 10 and cushion member 13 is completed and conditioned for practical use through the provision of attaching means operable to seat the skirt on and in close conforming engagement over the upper margin of a conventional seat back section 11 and to hold the assembly against inadvertent shift from its mounted position, and a preferred arrangement of such means adjustably adaptable to coaction with conventional seats of varying size, shape, and construction without reworking or alteration of any of the seat elements is illustrated and hereinbelow described.

In an efficient, convenient, and practical arrangement, the preferred attaching means have the form of flexible, non-extensible, length-adjustable straps 16, of appropriate fabric, or other, material, secured at corresponding ends one to each of the corners of the skirt 10 to extend thence substantially perpendicular to the length of the member 13. The straps 16 may be secured to and in the appropriate relation with the skirt 10 in any expedient manner, and when the skirt is of synthetic resin material it is eminently feasible to loop the strap ends through elongated slots 17 intersecting corner areas of the skirt inwardly adjacent and parallel to the side margins thereof and to either permanently close the loops, as by stitching 18, or the equivalent, or to adjustably complete the loops through the agency of a slide clip 19, buckle, or analogous facility, wherethrough length-adjustment of the strap may be had. However secured to the skirt and arranged for length-adjustment, the straps 16 at the side of the skirt under the overhang of the nosing 14 terminate in loops 20 expediently adjustable through the agency of slide clips 19, through which loops 20 a rod 21 engages in substantial parallelism with the length of the member 13 in position to be clamped and held by the conventional seat cushion 22 in the angle at the base of the seat back section 11 wherein the rear margin of the cushion is received when the skirt 10 is mounted on the upper margin of said back section with the straps terminating in said loops 20 depending across the forward face of the section, as shown by Figure 4. The straps 16 at the side of the skirt 10 remote from the nosing 14 are adapted to depend across the rear face of the seat back section 11 and terminate in hooks 23, or the like, designed for coaction with elements of the seat assembly, such as the lower margin of the back section, spring elements exposed through the lower area of the seat assembly, or other structural components of a given such assembly, whereby, with the straps 16 properly adjusted and tensioned, the skirt 10 is securely and detachably related with and held to the upper margin of the seat back section 11 in a selected adjustment thereon which projects the nosing 14 forwardly from and above the seat back section in position to comfortably and yieldably support the head of a seat occupant.

Figure 7:
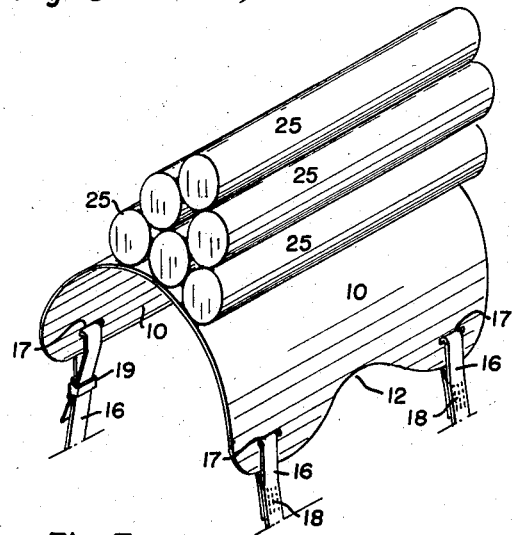
Figure 7 is a view similar to Figure 5 illustrating a further modification of the headrest unit construction within the contemplation of the invention.
Figure 8:
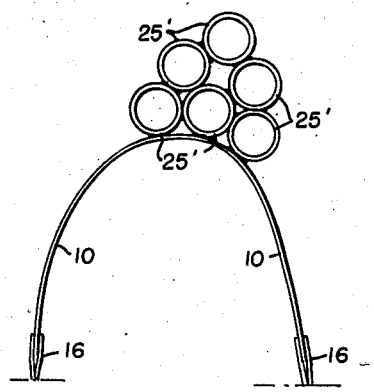
Figure 8 is an end view of the arrangement according to Figure 7 as adapted through substitution of alternative elements.

The modified and alternative constructions of the improvement typified by Figures 5-8, inclusive, all utilize and include the skirt 10 with its associated attaching means as above described for the development of headrest organizations differing from the foregoing only as to structural particularity of the cushion feature carried by the skirt for direct support of the user's head. Eliminating the specialized form of the trough-like member 13 of the embodiment first described, the modified and alternative constructions substitute therefor stock cylindrical or tubular elements of stiffly-pliant, preferably synthetic resin material adhered or heat-welded to the skirt 10 and to each other in various arrangements functionally equivalent to that including the member 13. In the arrangement according to Figure 5, one larger and two slightly smaller straight, hollow, end-closed cylinders 24 of appropriate material are tangentially intersecured and fixed to the skirt 10 in close simulation of the above-described association of the member 13 therewith to provide a head support unit yieldably and comfortably reactive to pressures imposed radially of the cylinders, and in Figure 6 the arrangement is identical with that of Figure 5 save that the analogous cylinders 24' are open at their ends and hence have no air cushion properties or reactions. Figure 7 typifies a head support cushion constituted from a plurality, possibly six, of like straight, hollow, end-closed cylinders 25 of stiffly-pliant material interbonded and secured to the skirt 10 to simulate the form and functional position of the member 13, while in Figure 8 is represented the arrangement of Figure 7 developed through the use of open-end cylinders 25'. Detachably mounted and adjustably positioned by means of the skirt 10 and attaching straps 16 as hereinabove set forth, it is readily manifest that the arrangements represented by Figures 5-8, inclusive, function in association with the back section of a conventional seat to provide yieldable rests and comfortable supports for the head of a seat user in the same manner as does the member 13 of the embodiment first described.

Since changes, variations, and modifications in the form, construction, and operative arrangement of the elements shown and described may be had without departing from the spirit of my invention, I wish to be understood as being limited solely by the scope of the appended claims, rather than by any details of the illustrative showing and foregoing description.

I claim as my invention:

1. A headrest accessory for detachable association with conventional automobile and analogous seat assemblies, comprising a flexible, concavo-convex skirt adapted to conformably embrace and seat on the upper margin of a seat back section in overlapping relation with front and rear surface areas thereof, whereby said skirt shiftably envelops a portion of the associated seat back upper margin for selective adjustment both linearly therealong and arcuately thereof, a cushion member fixed longitudinally of and projecting radially from the convex surface of said skirt in an inward spacing from both side margins of the latter, and flexible, length-adjustable straps secured to both skirt side margins for connection with conventional elements of the seat assembly at opposite sides and adjacent the lower margin of the seat back section.

2. The organization according to claim 1, wherein said cushion member is formed with a longitudinal nosing bulging laterally and upwardly therefrom parallel to and remote from the adjacent skirt area adapted to forwardly overhang the associated seat back section.

3. The organization according to claim 1, wherein said skirt is formed of air-impermeable material and said cushion member is an end-closed, trough-like unit of flexible air-impermeable material inverted to conforming marginal engagement with and marginally sealed to said skirt, whereby to provide a resiliently-compressible, hollow head support disposed to upstand from and above the seat back margin embraced by the skirt.

4. The organization according to claim 1, wherein said skirt is formed of air-impermeable material, said cushion member is an end-closed, trough-like unit of flexible, air-impermeable material formed with a longitudinal nosing bulging outwardly therefrom parallel to and remote from one free side margin thereof, and the initially-free margins of said unit conformably engage and are sealed to the skirt, whereby to provide a resiliently-compressible, hollow head support disposed to upstand from and above the seat margin embraced by the skirt with said nosing directed upwardly and forwardly therefrom.

5. The organization according to claim 1, wherein the straps secured to one side margin of the skirt terminate in loops adapted to embrace a rod retentively engageable in the junction angle of the conventional seat assembly sections, and the others of said straps terminate in hooks connectible with structural elements of the seat assembly exposed thereunder.

References Cited in the file of this patent

UNITED STATES PATENTS

| | | |
|---|---|---|
| 18,998 | Waters | Dec. 29, 1857 |
| 243,228 | Doremus | June 21, 1881 |
| 247,823 | Hiller | Oct. 4, 1881 |
| 497,697 | Wesson | May 16, 1893 |
| 2,040,463 | Brueckl | May 12, 1936 |
| 2,056,479 | Newman | Oct. 6, 1936 |
| 2,462,215 | Norman | Feb. 22, 1949 |
| 2,560,925 | Brown | July 17, 1951 |
| 2,589,013 | Martin | Mar. 11, 1952 |
| 2,605,818 | Dabbs et al. | Aug. 5, 1952 |
| 2,632,497 | Brady | Mar. 24, 1953 |
| 2,756,808 | Eichorst | July 31, 1956 |
| 2,801,677 | Pinkerton et al. | Aug. 6, 1957 |